United States Patent
Zhang et al.

(10) Patent No.: US 11,541,763 B2
(45) Date of Patent: Jan. 3, 2023

(54) HYBRID ENERGY STORAGE SYSTEM OPTIMIZATION STRATEGY WITH INTELLIGENT ADAPTIVE CONTROL

(71) Applicant: Caterpillar Inc., Peoria, IL (US)

(72) Inventors: Yanchai Zhang, Dunlap, IL (US); Baoyang Deng, Edwards, IL (US); Michael A. Snopko, Washington, IL (US); Theodore E. Wiersema, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 352 days.

(21) Appl. No.: 16/787,629

(22) Filed: Feb. 11, 2020

(65) Prior Publication Data

US 2021/0245607 A1  Aug. 12, 2021

(51) Int. Cl.
*B60W 20/12* (2016.01)
*B60L 15/20* (2006.01)
*G05F 1/66* (2006.01)
*B60L 50/15* (2019.01)

(52) U.S. Cl.
CPC ............ *B60L 15/2045* (2013.01); *G05F 1/66* (2013.01); *B60L 50/15* (2019.02)

(58) Field of Classification Search
CPC ........ G05F 1/66; B60L 50/10; B60L 15/2045; B60L 50/15; B60L 50/16; Y02T 10/72; Y02T 10/64; Y02T 10/7072
See application file for complete search history.

(56) References Cited

U.S. PATENT DOCUMENTS

| | | | |
|---|---|---|---|
| 7,482,767 B2 | 1/2009 | Tether | |
| 8,062,081 B2 | 11/2011 | Barrett et al. | |
| 8,706,330 B2 | 4/2014 | Caouette | |
| 10,046,651 B2 | 8/2018 | Lin et al. | |
| 10,170,912 B2 | 1/2019 | Mathiesen et al. | |

(Continued)

FOREIGN PATENT DOCUMENTS

| | | |
|---|---|---|
| CN | 104527958 B | 5/2017 |
| JP | 6044922 B2 | 11/2016 |

(Continued)

OTHER PUBLICATIONS

Extended European Search Report for International Patent Appln No. 21153122.3-1205, dated Jun. 7, 2021 (11 pgs).

*Primary Examiner* — Jared Fureman
*Assistant Examiner* — Esayas G Yeshaw
(74) *Attorney, Agent, or Firm* — Harrity & Harrity LLP

(57) ABSTRACT

A control system implementing a hybrid energy storage system (ESS) optimization strategy is disclosed. The hybrid ESS optimization strategy may be implemented in a machine that comprises a power system that includes a plurality of power sources and a power controller that includes one or more processors. The power controller may receive information related to a set of brake-specific fuel consumption (BSFC) maps associated with the plurality of power sources, determine a performance indicator using a cost function associated with the plurality of power sources, and generate a command to operate the power system based on a power distribution that minimizes an energy cost to operate the power system based on the information related to the set of BSFC maps, the performance indicator, and a load associated with the power system.

20 Claims, 8 Drawing Sheets

(56) References Cited

U.S. PATENT DOCUMENTS

| | | |
|---|---|---|
| 2010/0094490 A1 | 4/2010 | Alston et al. |
| 2012/0296482 A1 | 11/2012 | Steven |
| 2015/0217756 A1 | 8/2015 | Kitabatake |
| 2015/0274275 A1 | 10/2015 | Dust et al. |
| 2018/0290645 A1* | 10/2018 | Zhao .................... B60W 10/26 |
| 2020/0070679 A1* | 3/2020 | Wang .................... B60W 10/08 |
| 2020/0262413 A1* | 8/2020 | Song .................... B60K 6/485 |

FOREIGN PATENT DOCUMENTS

| | | |
|---|---|---|
| WO | 2016150815 | 9/2016 |
| WO | 2017030711 | 2/2017 |

\* cited by examiner

HYBRID ENERGY STORAGE SYSTEM OPTIMIZATION STRATEGY WITH INTELLIGENT ADAPTIVE CONTROL

TECHNICAL FIELD

The present disclosure relates generally to power system management and, more particularly, to a control system that may implement a hybrid energy storage system (ESS) optimization strategy with intelligent adaptive control.

BACKGROUND

Mobile machines, such as marine vessels, often include power systems in which multiple power sources (e.g., one or more engines, one or more batteries, and/or the like) are harnessed together to drive one or more primary loads (e.g., propulsion) and one or more auxiliary loads (e.g., heating, ventilation, and air conditioning (HVAC), lighting, pumps, and/or the like). In many cases, the multiple power sources may have different operating ranges, speeds, efficiencies, expected useful life, and/or the like. The power sources can be mechanically connected to the load(s) or electrically connected to the load(s) by way of generators. In some applications, the load(s) of a machine can be driven both mechanically and electrically in a hybrid arrangement. For example, a hybrid system may include one or more combustion engines (e.g., gasoline engines, diesel engines, dynamic gas blending (DGB) engines) and an energy storage system (ESS) that can use energy captured at an earlier time to handle at least a portion of the load(s) associated with the machine in order to optimize fuel consumption, reduce emissions, increase system performance for transient response, perform peak shaving to maintain system stability, reduce total ownership and operation costs, and/or the like. However, due to variability and fluctuations in the load(s) to be driven by the power system, different capabilities of the multiple power sources, and/or other dynamic variables, determining an optimal distribution of a power demand among the multiple power sources can be a challenging task.

One attempt to allocate power and energy among different power sources is disclosed in U.S. Pat. No. 10,170,912 that issued to Mathiesen et al. on Jan. 1, 2019 ("the '912 patent"). In particular, the '912 patent discloses a marine vessel with an Energy Control System (ECS) that automatically adapts to a power plant configuration and type of motor generator sets (MGSs) and energy storage units, such as batteries or capacitors, and calculates the total amount of available load ramp at any particular instant (kW/s). The calculated total load ramp values are sent to a Dynamic Positioning (DP) control system and used so that changes in thruster command signals provided by a Thrust Allocation Optimization (212) are always harmonized with changes in the maximum load ramp signals. The '912 patent also discloses that the system automatically takes into account a change in dynamic or available instantaneous power capacity based on characteristics of the connected MGS and battery units, since the dynamic capacity of the battery may vary substantially based on the charge/discharge rate for the battery.

While the ECS described in the '912 patent may automatically adapt to a power plant configuration and type of MSGs and energy storage units, such as batteries or capacitors, and calculate a total amount of available load ramp in a marine vessel power plant at any particular instant, the '912 patent fails to disclose a technique to determine a dynamic optimization map that provides an optimal power distribution for power sources included in the marine vessel power plant based on different operating conditions, information related to the health and/or remaining useful life of the power sources, and/or other dynamic variables.

The hybrid ESS optimization control system of the present disclosure solves one or more of the problems set forth above and/or other problems in the art.

SUMMARY

According to one implementation, a method may include: receiving information related to a load associated with a power system and information related to a set of brake-specific fuel consumption (BSFC) maps associated with the power system; determining a performance indicator using a cost function associated with a plurality of power sources included in the power system; determining a power distribution among the plurality of power sources to minimize an energy cost associated with the load based on the set of BSFC maps and the performance indicator; and generating a command to operate the power system based on the power distribution, wherein the command indicates a first amount of power associated with operating one or more engines among the plurality of power sources and a second amount of power associated with operating one or more batteries among the plurality of power sources.

According to another implementation, a device may include one or more memories and one or more processors, communicatively coupled to the one or more memories, configured to: receive a set of input parameters comprising a load associated with a power system, a plurality of BSFC maps respectively associated with a plurality of engines, and a battery-equivalent BSFC map associated with one or more batteries; determine one or more performance indicators using a cost function based on health information associated with the plurality of engines and health information associated with the one or more batteries; generate a dynamic optimization map based on the set of input parameters and the one or more performance indicators; and generate, based on the dynamic optimization map, a command to operate the power system according to a power distribution that minimizes an energy cost associated with the load.

According to yet another implementation, a machine may include: a power system including a plurality of power sources; and a power controller including one or more processors. The one or more processors may be configured to: receive information related to a set of BSFC maps associated with the plurality of power sources; determine a performance indicator using a cost function based on health information associated with the plurality of power sources; and generate a command to operate the power system based on a power distribution that minimizes an energy cost to operate the power system based on the information related to the set of BSFC maps, the performance indicator, and a load associated with the power system.

DETAILED DESCRIPTION

This disclosure relates to a power controller that may implement a hybrid energy storage system (ESS) optimization strategy with intelligent adaptive control. The hybrid ESS optimization strategy has universal applicability to any machine having a power system that includes multiple power sources, such as generator sets (or "gensets") including combustion engines, generators, and/or the like, ESS elements such as batteries, and/or the like. As some examples, the machine may be a marine vessel, an airplane, a vehicle, and/or the like. Moreover, one or more implements may be connected to the machine and driven from the power system based on one or more control signals generated using the power controller that implements the hybrid ESS optimization strategy with intelligent adaptive control.

Figure 1:
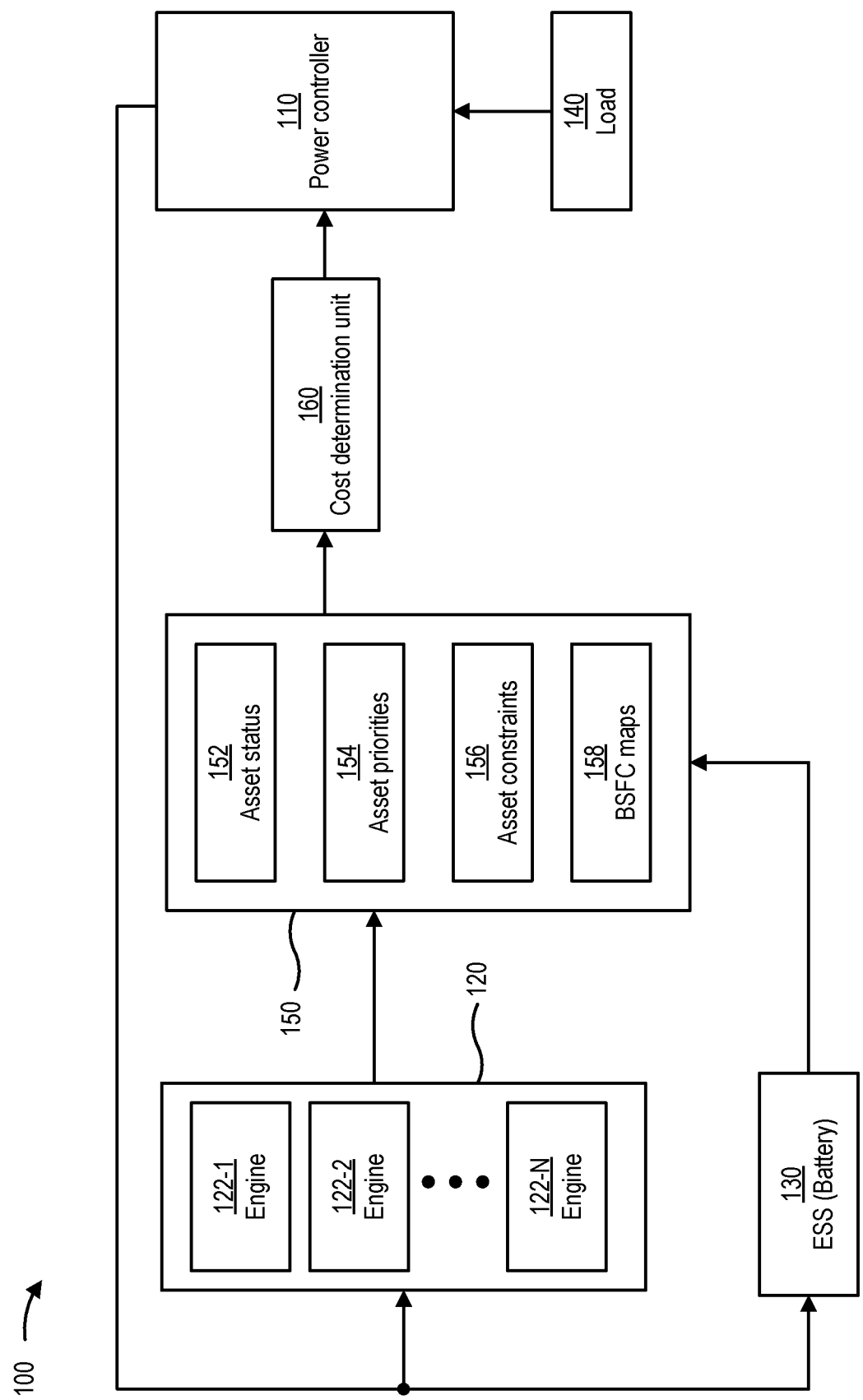
FIG. 1 is a diagram of one or more example implementations of a control system that may implement a hybrid energy storage system (ESS) optimization strategy with intelligent adaptive control described herein.

FIG. 1 is a diagram of one or more example implementations 100 of a control system that may implement a hybrid ESS optimization strategy with intelligent adaptive control. As shown in FIG. 1, implementation(s) 100 may include a power controller 110 configured to control a power system that includes multiple power sources. For example, as shown in FIG. 1, the multiple power sources may include a generator set 120 (sometimes referred to as a "genset") including one or more engines 122 (shown as engines 122-1 to 122-N, where N is an integer and N≥1) that are connected to corresponding generators and engine controllers. In addition, the multiple power sources may include an ESS 130 that may include one or more devices configured to store energy that can be discharged or otherwise used at a later time. For example, ESS 130 may include one or more batteries connected to controller devices and bi-directional power (BDP) inverters that convert direct current into alternating current. As described herein, the multiple power sources may be configured to selectively supply energy to support a load 140. For example, engine(s) 122 may be operatively connected to ESS 130 and to load 140 to selectively supply power thereto, and ESS 130 may be operatively connected to engine(s) 122 to selectively receive and supply power with respect to engine(s) 122 and may be operatively connected to load 140 to selectively supply power to support the load 140. Power controller 110 and the power system may be operatively associated with a machine, such as, for example, a marine vessel, a locomotive, an on- or off-highway vehicle, a genset, and/or another work performing machine.

Engine(s) 122 may include any number and/or type of combustion engines, some or all of which may be connected to corresponding generators to form generator sets. For example, engine(s) 122 may include a gasoline or diesel combustion engine, a dynamic gas blending (DGB) engine, a fuel cell, a natural gas engine, and/or the like. Engine(s) 122 may also include a prime mover (e.g., a crankshaft) that is mechanically decoupled from ESS 130 and load 140. Engine(s) 122 may be operatively connected to ESS 130 and load 140 via one or more electrical and/or hydraulic circuits and may effectively operate as a source of energy or power. Engine(s) 122 may be controlled by an engine control module (ECM) to selectively generate varying amounts of power based on ECM varying one or more engine operation parameters of the engine(s) 122. For example, the engine operation parameters may include an amount of fuel injected into a combustion chamber, an opening and/or closing timing of intake and/or exhaust valves, and/or the like. Mechanical outputs of engine(s) 122 may be routed directly to load 140 (e.g., mechanically routed to drive shafts, such as a propeller drive shaft for a marine vessel) and/or indirectly by way of the generators (e.g., electrically routed to motors for the propellers and to the other auxiliary loads).

In some implementations, multiple engines 122 may collaborate to satisfy a power demand determined by load 140. For example, larger medium-speed engines 122 may be capable of greater power output at higher fuel efficiency (e.g., lower fuel consumption) and/or lower emissions. In contrast, smaller high-speed engines 122 may be capable of faster transient response and high-efficiency operation for a machine operating at lower loads. A particular machine may include multiple engines 122 that have different capabilities, and/or the like. Additionally, or alternatively, a particular machine may include multiple engines 122 that have the same rating and efficiency, but different capabilities, and/or the like.

ESS 130 may include one or more devices that can store previously produced energy for a subsequent use. For example, ESS 130 may include one or more batteries, accumulators, capacitors, and/or other suitable devices that can store and subsequently discharge energy. In some implementations, the devices making up ESS 130 may be arranged to be charged by energy received from engine(s) 122 and may subsequently discharge energy. The discharged energy may provide a backup energy source for engine(s) 122, may provide peak shaving by acting as a buffer and/or leveling agent of load 140 driven by engine(s) 122, may provide instantaneous power to support load 140, and/or the like. Chemical energy generated from burning fuel is converted in kinetic energy and thermal energy. The kinetic energy may cause the machine rotation. The generator may convert the rotation into electrical energy (e.g., electrical current and/or voltage) and may, by charging ESS 130, store the electrical energy into the ESS 130.

Load 140 may include a profile associated with electrical requirements to propel a machine, such as electrical requirements to power electrically-driven propulsion units that can independently rotate with respect to a hull of a marine vessel in order to propel the marine vessel. Additionally, or alternatively, load 140 can include other electrical requirements of a machine, such as electrical requirements to operate auxiliary loads such as implements to lift and move freight, communication equipment, heating, ventilation, and air conditioning (HVAC) systems, lighting, and/or the like.

As further shown in FIG. 1, a set of input parameters 150 may be provided to a cost determination unit 160. The cost determination unit 160 may include one or more processors configured to execute a cost function to produce one or more performance indicators. For example, the power controller 110 may evaluate the performance indicator(s) according to the current load 140 to determine a power distribution (or load share) proportion for each of the power sources included in the power system. For example, as described herein, power controller 110 may identify a number of power sources and capacity of each power source in a given power system, identify a given power load, identify an operation to be performed on the given power load, identify the total amount of energy to be produced by the power system to perform the desired operation on the given load (e.g., in kilowatts (kW)), generate control signals or commands indicating a desired proportion of the total amount of energy to be produced by each power source included in the power system, and/or the like. Accordingly, each power source included in the power system may create a mechanical and/or electrical power output based on the desired proportion of the total amount of energy to be produced by each respective power source.

As further shown in FIG. 1, the set of input parameters 150 provided to the cost determination unit 160 may include asset status information 152, asset priorities 154, asset constraints 156, brake-specific fuel consumption (BSFC) maps 158, and/or the like. Asset status information 152 may indicate whether a given engine 122 and/or device in the ESS 130 is online, offline, idling and ready to ramp up quickly, and/or the like. In this way, the asset status information 152 may indicate which power sources in the power system are ready and available to use, how quickly offline or idling power sources can be brought into an online and available state, and/or the like, which may enable power controller 110 to determine whether to turn an engine 122, a battery, and/or the like on or off based on incoming load 140.

Asset priorities 154 may include priority information associated with each engine 122 and/or device in the ESS 130, which may vary depending on load 140, operating mode, health information, and/or the like. For example, asset priorities 154 may vary based on a size of the engines 122, fuel sources for the engines 122, capacities or state of charge (SOC) levels for the batteries in ESS 130, and/or the like. The priority can be impacted by maintenance hours, health of the asset, the efficiency of the asset, and/or the like. Furthermore, the priorities may vary depending on whether the machine is operating in a high performance mode, a fuel economy mode, an emission reduction mode, and/or the like. For example, if load 140 is associated with a fast response requirement, asset priorities 154 may assign a highest priority to a battery that can provide instantaneous power to support the engines 122, and an engine 122 that can provide a fast transient response time (e.g., a turbocharged diesel engine) may be assigned a higher priority than another engine 122 (e.g., a gasoline engine) that has a slower transient response time.

Furthermore, in some implementations, asset priorities 154 may be customer-defined (e.g., based on performance of different engines 122 that are produced by different manufacturers) and/or health information to maximize or extend a useful life of a power source. For example, if two engines 122 have an identical or substantially similar performance rating, an engine 122 that has been used less or is farther away from end-of-life may be assigned a higher priority (e.g., to balance hours among engines 122).

Asset constraints 156 may include information related to one or more limitations on a corresponding power source. For example, asset constraints 156 may include information related to a minimum and/or a maximum amount of power to be produced by a particular power source. In another example, asset constraints 156 may integrate health information associated with the engines 122 and/or batteries included in ESS 130. For example, asset constraints 156 may indicate that an engine 122 that has a diagnostic problem or needs service is to be placed offline or is otherwise unavailable. Additionally, or alternatively, asset constraints 156 may include information related to a minimum duration and/or a maximum duration that the engines 122 are to be in an on or off state, information to prevent the batteries from being overcharged or otherwise used in a manner that may cause component degradation, and/or the like.

BSFC maps 158 may include two-dimensional curves and/or three-dimensional maps that measure efficiency of each power source. For example, BSFC maps 158 may include one or more BSFC maps that measure fuel efficiency for engines 122. Additionally, or alternatively, one or more battery-equivalent BSFC maps for the batteries or other devices included in ESS 130, which may be based on an accumulated energy cost associated with charging and discharging one or more batteries, an estimated life associated with the one or more batteries, and/or a replacement cost for the one or more batteries. In some implementations, each BSFC map 158 may be a two-dimensional curve measuring the fuel consumption rate of the respective power source as a function of produced power. Additionally, or alternatively, a BSFC map 158 may be based on one or more functions of both produced power and speed at which a corresponding power source is operated, and thus may include a three-dimensional map. BSFC maps 158 may be different for each engine 122 and/or for each different type of power source. In some implementations, BSFC maps 158 may be input to cost determination unit 160 to determine a combined fuel consumption rate and/or produced power for all the power sources at different possible load-sharing configurations.

As shown in FIG. 1, asset status information 152, asset priorities 154, asset constraints 156, and BSFC maps 158 may be input as parameters to cost determination unit 160, which may map values of the various parameters to an output (e.g., a real number) that represents a cost associated with the mapped values. For example, the output from the cost determination unit 160 may represent the cost for a particular load share or power distribution among the various power sources included in the power system. Accordingly, the output from the cost determination unit 160 may be provided to power controller 110, which may include an optimization component configured to select a particular power distribution that minimizes a target variable such as fuel consumption, emissions, transient performance loss, and/or the like.

For example, the optimization component may select a particular power distribution configuration that minimizes a financial cost per unit of energy (e.g., dollars per kilowatt hour ($/kWh)) incurred by the power system. Accordingly, the power controller 110 may issue a command that causes each power source in the power system to generate a corresponding amount of energy (e.g., in kilowatts) as specified by the optimization component. For example, the command may indicate an amount of power to be generated by the engines 122, which may be equally or unevenly distributed among the engines 122 based on health information associated with engines 122. Additionally, or alternatively, the command may indicate an amount of power associated with operating the one or more batteries or other devices included in ESS 130, where the amount of power associated with operating the one or more batteries may, for example, have a negative value to indicate that the batteries are to be charged by operating the engines 122, or a positive value to indicate that the batteries are to be discharged to supply power in support of or instead of engines 122.

As indicated above, FIG. 1 is provided as one or more examples. Other examples may differ from what is described in connection with FIG. 1.

Figure 2:
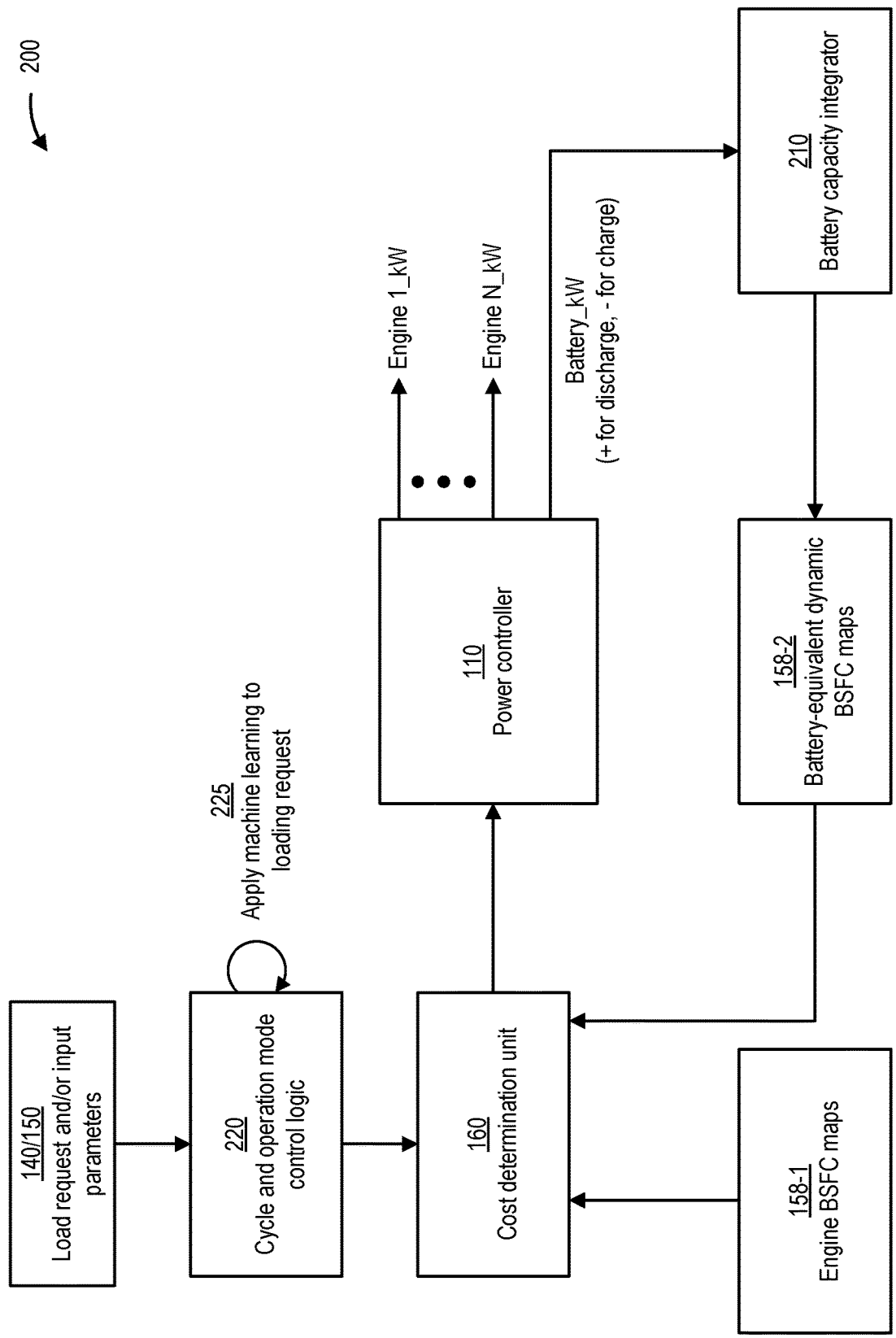
FIG. 2 is a diagram of one or more example implementations of a control system that may implement hybrid ESS optimization strategy with intelligent adaptive control described herein.

FIG. 2 is a diagram of one or more example implementations 200 of a control system that may implement a hybrid ESS optimization strategy with intelligent adaptive control described herein. Example implementation(s) 200 may use one or more engine BSFC maps 158-1 in conjunction with one or more battery-equivalent BSFC maps 158-2 as inputs to cost determination unit 160 to determine an appropriate power distribution proportion for using one or more batteries as a power source for a machine. For example, as described above, the engine BSFC maps 158-1 may generally measure fuel efficiency (e.g., in terms of grams per kWh (g/kWh)) for one or more corresponding engines as a function of power produced by the one or more engines. Accordingly, because batteries do not consume fuel, the battery-equivalent BSFC maps 158-2 may provide a mechanism to integrate efficiency of the one or more batteries into cost determination unit 160.

For example, the battery-equivalent BSFC maps 158-2 may generally provide a constant BSFC regardless of power produced by the one or more batteries because there is no change in fuel consumption at different power levels. Accordingly, because the engines may generally consume fuel when charging the batteries, the constant BSFC provided in the battery-equivalent BSFC maps 158-2 may be based on the fuel that the engines consume when charging the batteries. For example, if the engines are run for a period of time to charge the batteries, the constant BSFC may be based on the fuel that the engines consume during the period of time when the engines are running to charge the batteries, and no fuel costs may be associated with any time periods in which the batteries are discharged and/or in cases where the batteries are charged without using power from the engines (e.g., using braking energy in a hybrid automobile, using propeller motion caused by the force of water in a marine vessel, and/or the like).

Accordingly, in some implementations, a battery capacity integrator 210 may receive a command or control signal indicating an amount of power associated with operating the one or more batteries, which may, for example, have a positive value to indicate that the batteries are to be charged by running the engines, or a negative value to indicate that the batteries are to be discharged. In general, no fuel cost may be incurred when the batteries are discharged, but the engines may consume some amount of fuel each time that the engines are run to charge the batteries. Battery capacity integrator 210 may therefore measure the fuel that is consumed during the time period(s) when the engines are operated to charge the batteries, and integrate the fuel consumption into the battery-equivalent BSFC maps 158-2. In some implementations, battery capacity integrator 210 may determine an average value for the fuel that is consumed to charge the batteries based on load 140, an amount of time that engines are run to charge the batteries, and/or the like, and the average value may be used as the constant BSFC. Furthermore, each time that the engines are run to charge the batteries, battery capacity integrator 210 may update the constant BSFC to represent the average fuel consumed to charge the batteries to a level that is sufficient to produce a desired amount of energy, bi-directional efficiency losses associated with charging and discharging the batteries, and/or the like.

As further shown in FIG. 2, cycle and operation mode control logic 220 may receive information related to a current load request 140 and/or a set of input parameters 150, which may include asset status information 152, asset priorities 154, asset constraints 156, BSFC maps 158, and/or the like. In addition, the set of input parameters 150 that is provided to the cycle and operation mode control logic 220 may include information related to a current mode of operation, such as fuel economy, emission reduction, performance, spinning reserve, peak shaving, energy harvesting, backup power, and/or the like. Accordingly, as shown by reference number 225, cycle and operation mode control logic 220 may apply one or more machine learning techniques to learn and adapt to input parameters such as the current load request 140, historical load information, a predicted upcoming load, a battery state of charge (SOC) level, battery charging and/or discharge cycles, and/or the like. Accordingly, as described herein, the cycle and operation mode control logic 220 may apply the machine learning technique(s) to implement an informed decision-making process when determining one or more performance indicators that may be served as an input to cost determination unit 160 to further optimize the power distribution output by power controller 110.

For example, in some implementations, cycle and operation mode control logic 220 may train a machine learning model (e.g., a multi-engine optimization model) using a supervised training procedure. The input to the machine learning model may be specified by a subject matter expert, which may reduce an amount of time, an amount of processing resources, and/or the like needed to train the model relative to an unsupervised training procedure. In some implementations, the cycle and operation mode control logic 220 may use one or more other model training techniques, such as a neural network technique, a latent semantic indexing technique, and/or the like. For example, the cycle and operation mode control logic 220 may perform an artificial neural network processing technique (e.g., using a two-layer feedforward neural network architecture, a three-layer feedforward neural network architecture, and/or the like) to perform pattern recognition with regard to the cost associated with certain patterns of input parameters.

As an example, a supervised multi-label classification technique may be used to train the model. For example, as a first step, cycle and operation mode control logic 220 may map historical information related to load requests 140, input parameters 150, operational modes, and/or the like to different costs.

As a second step, cycle and operation mode control logic 220 may determine classifier chains, whereby labels of target variables may be correlated. In this case, cycle and operation mode control logic 220 may use an output of a first label as an input for a second label, and may determine a likelihood that a particular load request 140, input parameter 150, operational mode, and/or the like is associated with a particular cost based on a similarity to other parameters that include similar characteristics. In this way, cycle and operation mode control logic 220 transforms classification from a multilabel-classification problem to multiple single-classification problems, thereby reducing processing utilization.

As a third step, cycle and operation mode control logic 220 may determine a Hamming Loss Metric relating to an accuracy of a label in performing a classification by using the validation set of the data. For example, an accuracy with which a weighting is applied to each parameter and whether each parameter is associated with a particular cost, results in a correct prediction of whether a given power distribution is optimal, thereby accounting for differing amounts to which association of any one parameter influences the power distribution.

As a fourth step, cycle and operation mode control logic 220 may finalize the model based on labels that satisfy a threshold accuracy associated with the Hamming Loss Metric, and may use the model for subsequent prediction of the power distribution to be used when certain combinations of load requests 140, input parameters 150, operational modes, and/or the like are received.

In some implementations, a different device, such as a server device, may generate and train the model. The different device may send the model for use by the cycle and operation mode control logic 220. The different device may update and send (e.g., on a scheduled basis, on an on-demand basis, on a triggered basis, on a periodic basis, and/or the like) the model to the cycle and operation mode control logic 220.

Accordingly, cycle and operation mode control logic 220 may use any number of artificial intelligence techniques, machine learning techniques, deep learning techniques, and/or the like to learn and adapt to different load requests 140, input parameters 150, operational modes, and/or the like. Furthermore, in some implementations, battery capacity integrator 210 may use similar artificial intelligence techniques, machine learning techniques, deep learning techniques, and/or the like to determine the fuel cost associated with charging the batteries.

As indicated above, FIG. 2 is provided as one or more examples. Other examples may differ from what is described in connection with FIG. 2.

Figure 3:
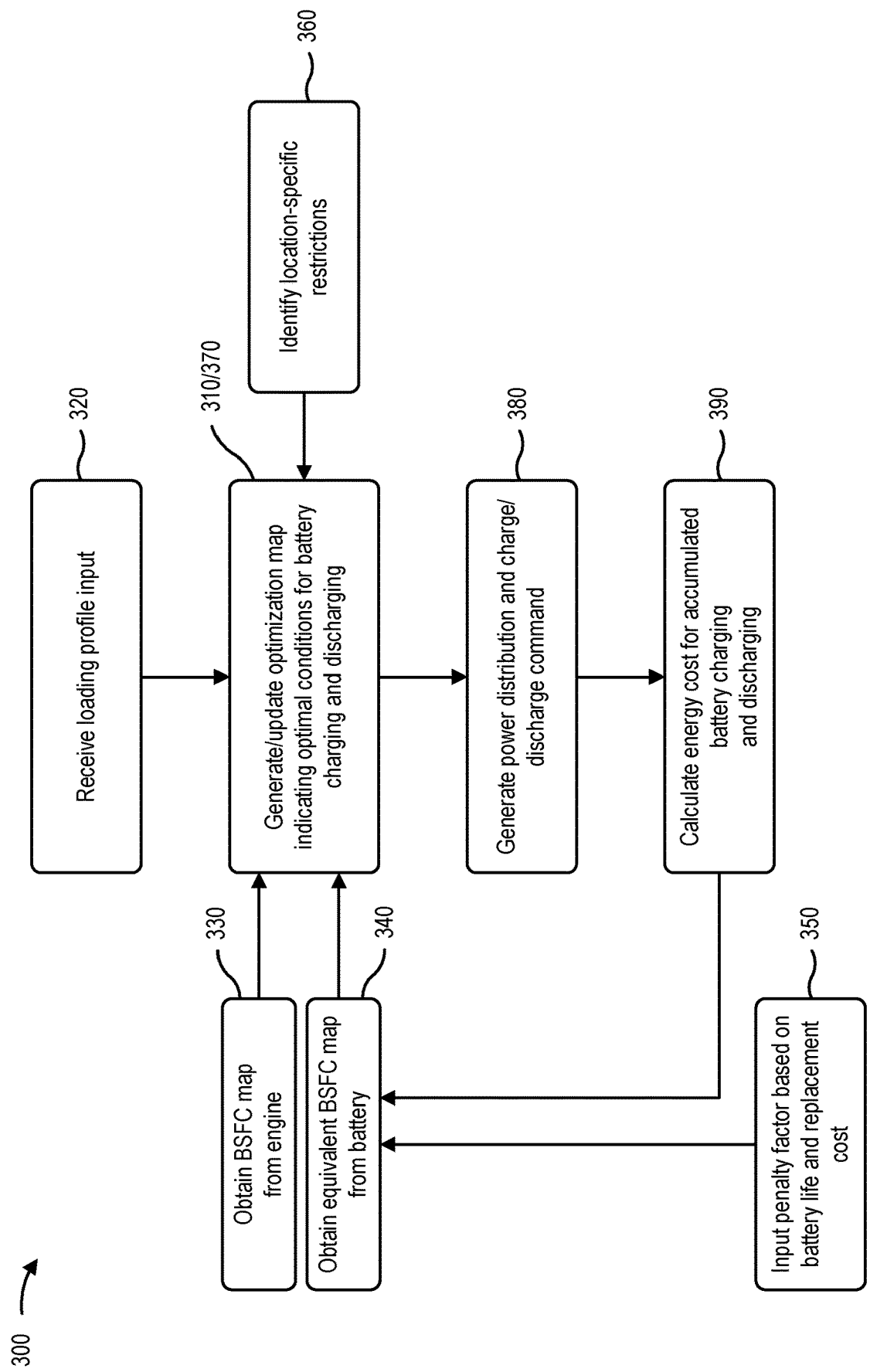
FIG. 3 is a flowchart of an example process for implementing a hybrid ESS optimization strategy with intelligent adaptive control.

FIG. 3 is a flowchart of an example process 300 for implementing a hybrid ESS optimization strategy with intelligent adaptive control. One or more process blocks of FIG. 3 may be performed by a device, such as a power controller (e.g., power controller 110), and/or another device or a group of devices separate from or including the power controller (e.g., an ECM associated with engine(s) 122, a BDP inverter or controller associated with ESS 130, and/or another device associated with implementation(s) 100, implementation(s) 200, and/or the like).

As shown in FIG. 3, process 300 may include generating a dynamic optimization map indicating optimal conditions for charging and/or discharging one or more batteries (block 310). For example, as described in more detail elsewhere herein, the dynamic optimization map may include a two-dimensional map or a three-dimensional map to indicate potential fuel savings as a function of various parameters, such as a charge level associated with one or more batteries (e.g., a total power before charge and/or a total power after charge), a load to be driven by a power system, and/or the like. In some implementations, the power controller may initially generate the dynamic optimization while the power system is in an offline state based on a set of default or baseline parameters, such as baseline BSFC curves associated with one or more engines, baseline battery-equivalent BSFC curves that are based on typical fuel consumption parameters to charge the one or more batteries, and/or the like.

As further shown in FIG. 3, process 300 may include receiving a loading profile input (block 320). For example, as described above, the loading profile input may include information related to a primary load including electrical requirements to propel a machine, such as electrical requirements to power electrically-driven propulsion units that can independently rotate with respect to a hull of a marine vessel in order to propel the marine vessel. Additionally, or alternatively, the loading profile can include information related to one or more auxiliary loads, such as electrical requirements to operate implements to lift and move freight, communication equipment, HVAC systems, lighting, and/or the like.

As further shown in FIG. 3, process 300 may include obtaining a BSFC map associated with one or more engines (block 330). For example, the BSFC maps obtained from the engine(s) may generally measure fuel efficiency for the corresponding engine(s) as a function of power produced by the one or more engines.

Next, the process 300 may include obtaining one or more battery-equivalent BSFC maps (block 340). For example, the battery-equivalent BSFC maps may provide a constant BSFC regardless of power produced by the one or more batteries because there is no change in fuel consumption at different power levels. Accordingly, a battery capacity integrator may measure fuel that one or more engine(s) consumed during time periods when the engine(s) operated to charge the batteries. In some implementations, the battery capacity integrator may use one or more artificial intelligence techniques, machine learning techniques, deep learning techniques, and/or the like to learn and adapt the parameters related to fuel that is consumed to charge the batteries. Furthermore, in some implementations, process 300 may include inputting information related to expected useful life for the one or more batteries, replacement costs for the one or more batteries, and/or the like as a penalty factor that may be considered in calculating the battery-equivalent BSFC map (block 350).

As further shown in FIG. 3, process 300 may include identifying any location-specific restrictions based on a current position or location of a machine associated with the power system (block 360). For example, in some cases, the machine may be a marine vessel that may operate in a dynamic positioning zone, which generally refers to an area in which the marine vessel employs a computer-controlled dynamic positioning (DP) system to automatically maintain a position and heading for the marine vessel using on-board propellers and thrusters. In such cases, the DP system may use a mathematical model that includes information related to the current position and direction of the vessel as well as information related to environmental forces affecting the position and/or direction of the vessel to calculate required steering angles and thruster outputs for each thruster, which may allow for operations at sea where mooring or anchoring may otherwise be unfeasible. Accordingly, because the vessel operating in a dynamic positioning zone may need to have a highly reliable power system to prevent drifting off-course, enable maneuverability under degraded status, and/or the like, dynamic positioning zones may be subject to a requirement that a backup power source is available in case of blackout or other failure of a primary power source. Accordingly, in some implementations, the power controller may receive information related to a current position of the machine associated with the power system and determine whether there are any location-specific restrictions or other requirements for operating the power system in the current position of the machine.

The process 300 may include updating the dynamic optimization map indicating the optimal conditions for charging and discharging the batteries (block 370). For example, the dynamic optimization map may be updated based on operating conditions, such as the loading profile input, the BSFC map(s) obtained from the engine(s), the battery-equivalent BSFC map(s), any location-specific restrictions, and/or the like. In some implementations, the updated dynamic optimization map may be available for the controller to use in order to determine a power distribution proportion to allocate among the engines (individually and/or collectively) and the batteries. Additionally, or alternatively, the power controller may calculate an instantaneous power distribution based on the operating conditions using a real-time optimization function.

The process 300 may further include generating a power distribution and battery charge/discharge command based on the current operating conditions (block 380). In some implementations, the power controller may generate the power distribution and battery charge/discharge command using the current dynamic optimization map. Additionally, or alternatively, the power controller can recalibrate the instantaneous power distribution based on the operating conditions using the real-time optimization function based on the current operating mode of the power system.

For example, in cases where the power system is operating in a transient mode that requires a fast response time, the power controller may use the dynamic optimization map to generate the power distribution and battery charge/discharge command, because the real-time optimization function may not converge fast enough to satisfy the response time required of the transient mode. In other cases, such as when the power system is operating in a fuel economy mode, an emission reduction mode, a high performance mode, and/or the like, the power controller may generate the power distribution and battery charge/discharge command using the real-time optimization function to ensure that the various power sources included in the power system are operating at maximum efficiency.

In some implementations, the power distribution and battery charge/discharge command may generally indicate an amount of power (e.g., a quantity of kilowatts) to be produced by each engine included in the power system, and an amount of power (e.g., a quantity of kilowatts) to be received and/or produced by each battery included in the power system. For example, as described above, the power controller may determine an optimal power distribution among the engine(s) and the battery power source(s) (e.g., based on the dynamic optimization map or an instantaneous calculation), considering the current load, operating mode, health information associated with the power sources, replacement costs, service costs, fuel costs, zone in which the machine is located, and/or the like.

For example, in cases where the machine is in a dynamic positioning zone that requires a backup power source, the power distribution and battery charge/discharge command may ensure that at least two power sources are operational (e.g., multiple engines, at least one engine and at least one battery, and/or the like). In another example, the command may cause one or more engines to generate an amount of power to charge the one or more batteries when there is a relatively small load (e.g., when the load fails to satisfy a load threshold) and/or the batteries have a low charge level (e.g., when the charge level fails to satisfy a charge threshold).

In still other example, the command may cause the batteries to be discharged to perform peak shaving to act as a buffer and prevent the engines from having to support a load above a load threshold, to provide immediate or instantaneous power to support the generators driven by the engines, and/or the like. Additionally, or alternatively, the command may cause the batteries to be charged to harvest or otherwise recover energy produced by renewable energy sources or machines such as cranes or drilling equipment, to provide a spinning reserve as a backup for generators driven by the engines and/or to reduce a quantity of online engines, and/or the like.

As further shown in FIG. 3, process 300 may include calculating an energy cost for accumulated battery charging and discharging based on the power distribution and charge/discharge command (block 390). For example, as described above, in some cases the batteries may be charged by running the engines for a period of time, which may cause the engines to consume a certain amount of fuel. Accordingly, as shown in FIG. 3, the accumulated fuel consumption cost for charging the batteries may be integrated into the battery-equivalent B SFC map that is used to update the dynamic optimization map and/or calculate the instantaneous power distribution based on the operating conditions using a real-time optimization function.

Process 300 may include variations and/or additional implementations to those described in connection with FIG. 3, such as any single implementation or any combination of implementations described elsewhere herein. Although FIG. 3 shows example blocks of process 300, in some examples, process 300 may include additional blocks, fewer blocks, different blocks, or differently arranged blocks than those depicted in FIG. 3. Additionally, or alternatively, two or more of the blocks of process 300 may be performed in parallel.

Figure 4:
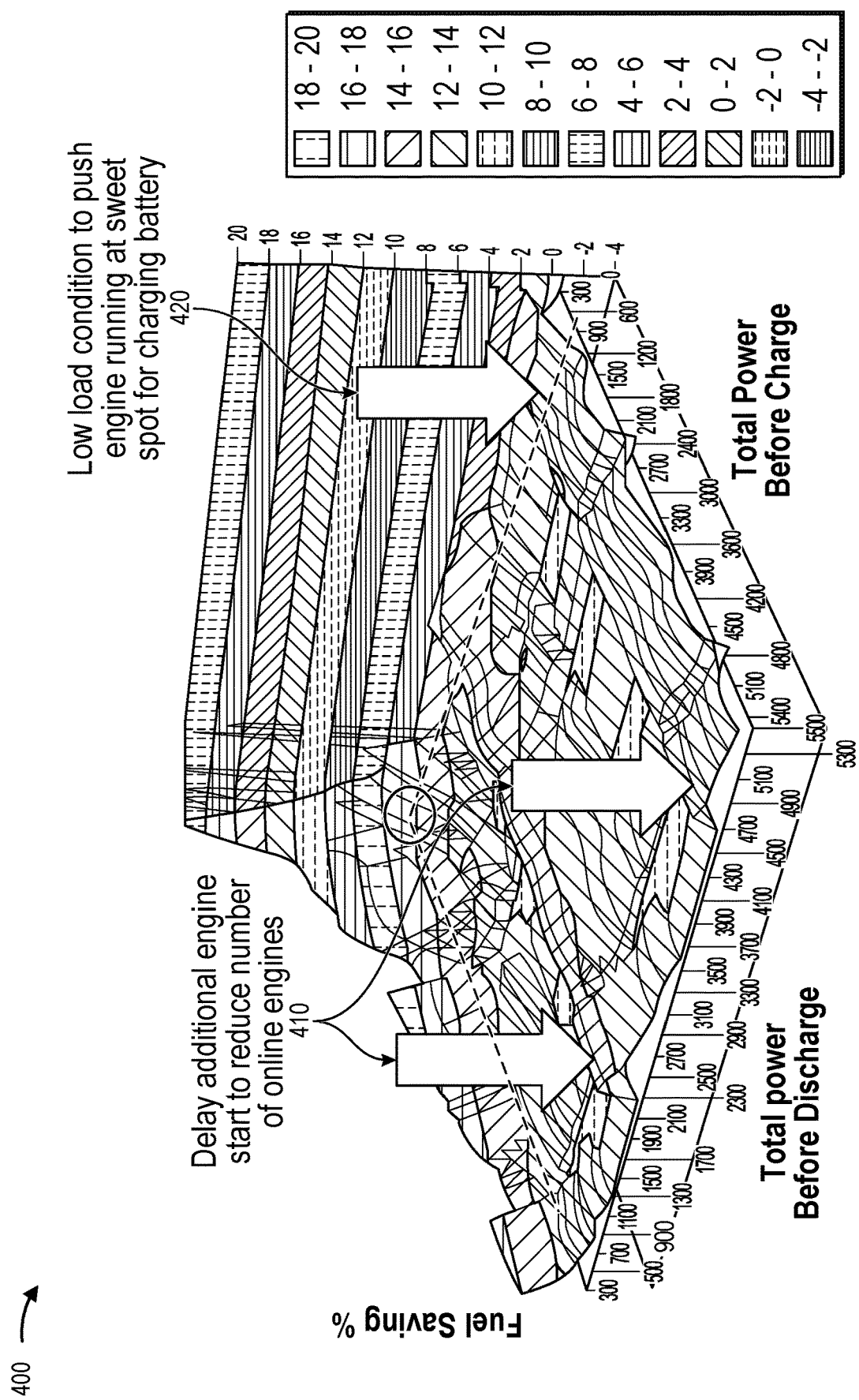
FIG. 4 is a diagram of an example dynamic optimization map that may be used in one or more implementations of a hybrid ESS optimization strategy with intelligent adaptive control described herein.

FIG. 4 is a diagram of an example dynamic optimization map 400 that may be used in one or more implementations of a hybrid ESS optimization strategy with intelligent adaptive control described herein. For example, as described above, the dynamic optimization map 400 may be used to determine a power distribution proportion for a power system (e.g., a percentage of a load to be distributed among various power sources, such as one or more engines and/or batteries) in cases where a fast response time is needed or where an instantaneous calculation is otherwise unavailable at a time when a command to operate the power system is generated.

As shown in FIG. 4, the dynamic optimization map 400 may represent potential fuel savings (e.g., as a percentage) as a function of total power before charging one or more batteries and total power before discharging the one or more batteries. Furthermore, in some implementations, the dynamic optimization map 400 may integrate information related to different load parameters. Accordingly, given a particular load to be handled by the power system, the dynamic optimization map 400 may indicate the potential fuel savings that may be achieved by using the engines to charge the batteries while the engines handle the load, versus discharging the batteries to handle the load or provide support to the engines.

For example, as shown by reference number 410, a battery may be discharged to support a high load and delay or avoid starting an additional engine (e.g., to reduce a number of engines that are online to support the load when the engines that are online are unable to handle the full load). In this way, the battery may be discharged to handle at least a portion of the load, which may offer fuel savings because the number of engines that are operating is reduced.

In another example, as shown by reference number 420, a low load condition may provide an opportunity to push one or more engines to run at a high speed that provides a sweet spot optimal for charging the one or more batteries. For example, the engines may generally have a more efficient fuel consumption at higher speeds, whereby a low load condition may provide an opportunity to run the engines at a high (fuel-efficient) speed to generate excess power (e.g., more power than is needed to handle the load) to charge the batteries at a lower fuel cost.

As indicated above, FIG. 4 is provided as one or more examples. Other examples may differ from what is described in connection with FIG. 4.

Figure 5:
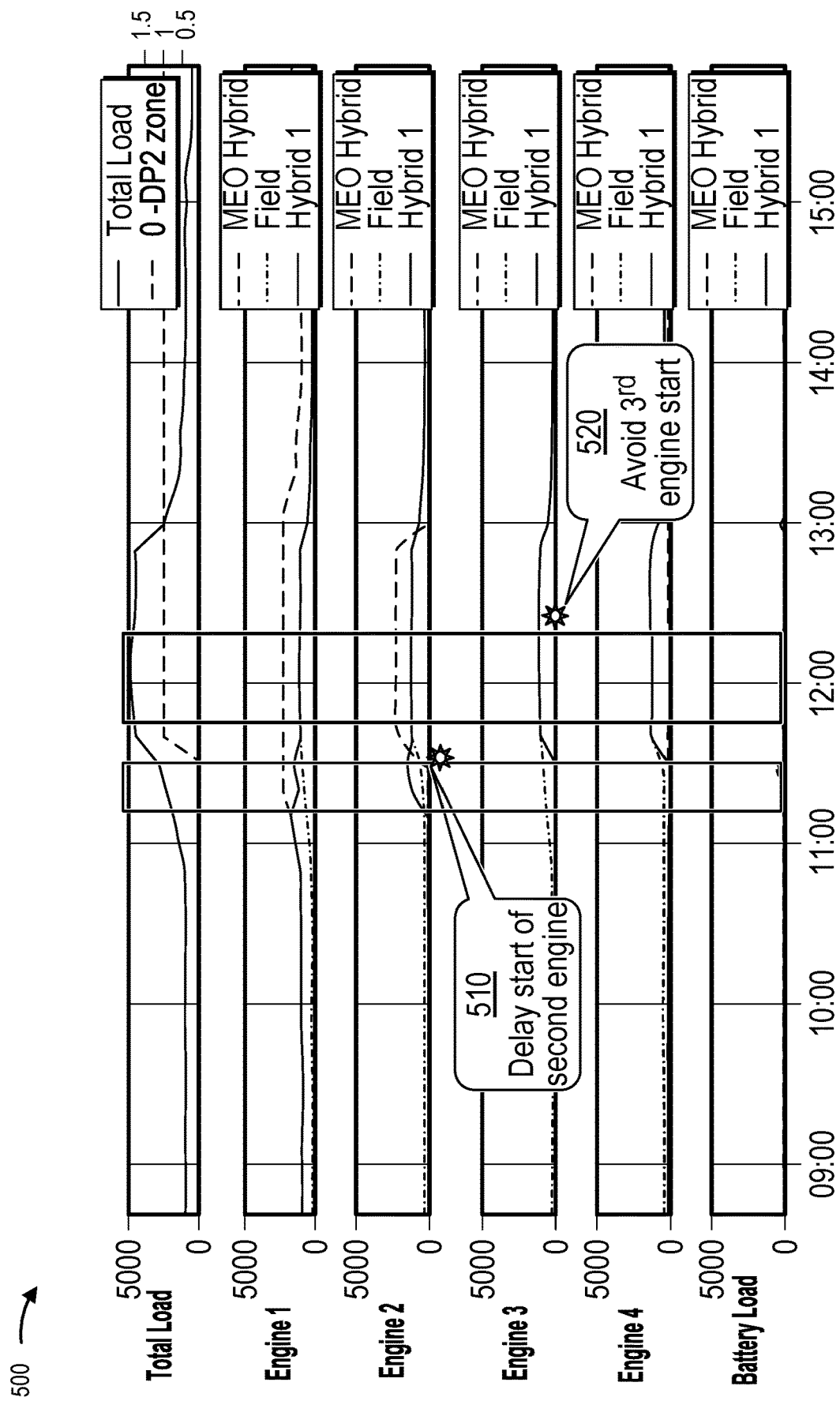
FIG. 5 is a plot of one or more example implementations of a hybrid ESS optimization strategy with intelligent adaptive control described herein.

FIG. 5 is a plot 500 of one or more example implementations of a hybrid ESS optimization strategy with intelligent adaptive control described herein. For example, as described above, plot 500 may represent real-time instantaneous calculations of a total load in a power system based on individual loads supported by multiple engines (shown as engines 1-4) and a battery included in the power system. In FIG. 5, the x-axis represents time and the y-axis represents a load (e.g., in kilowatts).

As shown in FIG. 5, the power controller may initially operate only a first engine (engine 1) during a time period when the first engine is able to handle the total load. For example, the total load experiences a small increase in the first shaded vertical bar, and the first engine is pushed to a higher load to support the increase in the total load. Accordingly, as shown by reference number 510, the power controller may delay starting a second engine based on plot 500 indicating that the first engine is able to handle the increase in load until a time when the total load increases beyond a point that the first engine is able to independently handle the load.

In this way, by delaying the start of the second engine, fuel may be saved during the time period when the second engine is permitted to remain offline. Furthermore, as shown by reference number 520, the power controller may avoid starting a third engine altogether because the first engine and the second engine are able to handle the total load. In this way, additional fuel may be saved by reducing the number of engines that are running to support the load and/or reducing the amount of time that the engines are running. For example, running an engine at a low load level may generally be less fuel-efficient than running the engine at a high load level. Accordingly, by running the first engine at a high load and delaying starting the second engine until the total load exceeds a capacity of the first engine may result in the first engine running at a higher fuel efficiency while also reducing fuel consumed by the second engine. Similarly, by running the first and second engines at higher loads and avoiding starting the third engine, the first and second engines may run at a higher fuel efficiency compared to running three engines at a low load.

As indicated above, FIG. 5 is provided as one or more examples. Other examples may differ from what is described in connection with FIG. 5.

Figure 6:
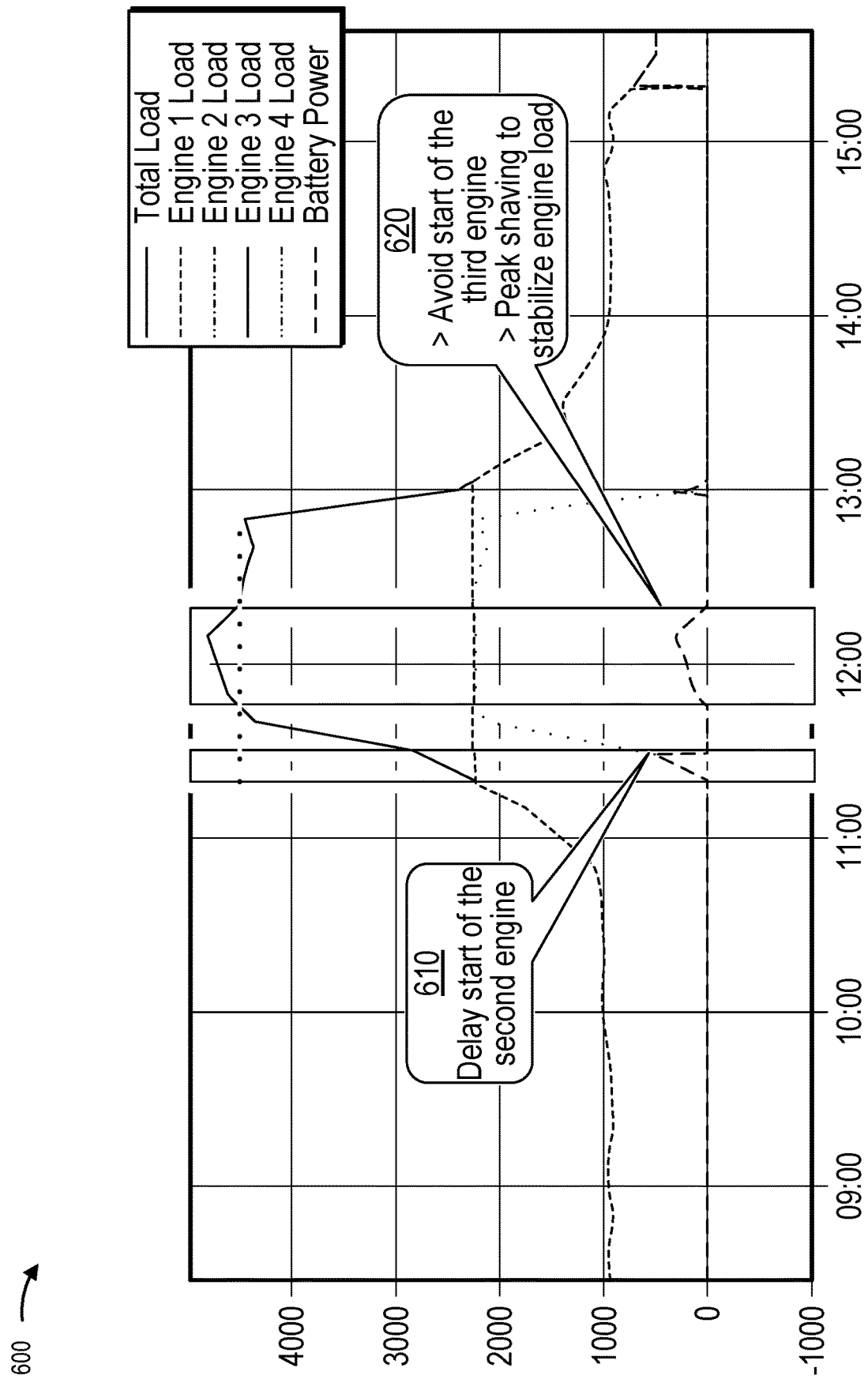
FIG. 6 is a plot of one or more example implementations of a hybrid ESS optimization strategy with intelligent adaptive control described herein.

FIG. 6 is a plot 600 of one or more example implementations of a hybrid ESS optimization strategy with intelligent adaptive control described herein. For example, plot 600 may represent real-time instantaneous calculations of a total load in a power system based on individual loads supported by multiple engines (shown as engines 1-4) and a battery included in the power system, which may be used to implement peak shaving and load leveling. In some implementations, the multiple engines may be associated with certain identifiers, such as part numbers or engine series numbers that enable the engines to be separately identified or otherwise managed (e.g., engines 1-4 may be associated with respective identifiers such as TKY00274, TKY00275, TKY00276, and TKY00277). In FIG. 6, the x-axis represents time and the y-axis represents a load (e.g., in kilowatts).

As shown in FIG. 6, the power controller may initially operate only a first engine (shown as Engine 1 load) during a time period when the total load is below a threshold (e.g., about 2000 kW in the illustrated example). Accordingly, as shown by reference number 610, the power controller may delay starting a second engine until the total load satisfies the threshold, at which time the second engine may be started in order to level the load allocated to the first engine (e.g., to prevent the first engine from having to produce more than the threshold amount of power).

As further shown in FIG. 6, the first and second engines may be operational until the total load crosses a second threshold. Accordingly, as shown by reference number 620, the power controller may discharge the battery (which may have been in a charging state while only the first and/or second engines were running) to handle the peak portion of the load and to level or otherwise stabilize the load distributed to the first and second engines. Furthermore, by discharging the battery to handle the peak portion of the load, the power controller may avoid starting the third engine, to save fuel.

As indicated above, FIG. 6 is provided as one or more examples. Other examples may differ from what is described in connection with FIG. 6.

Figure 7:
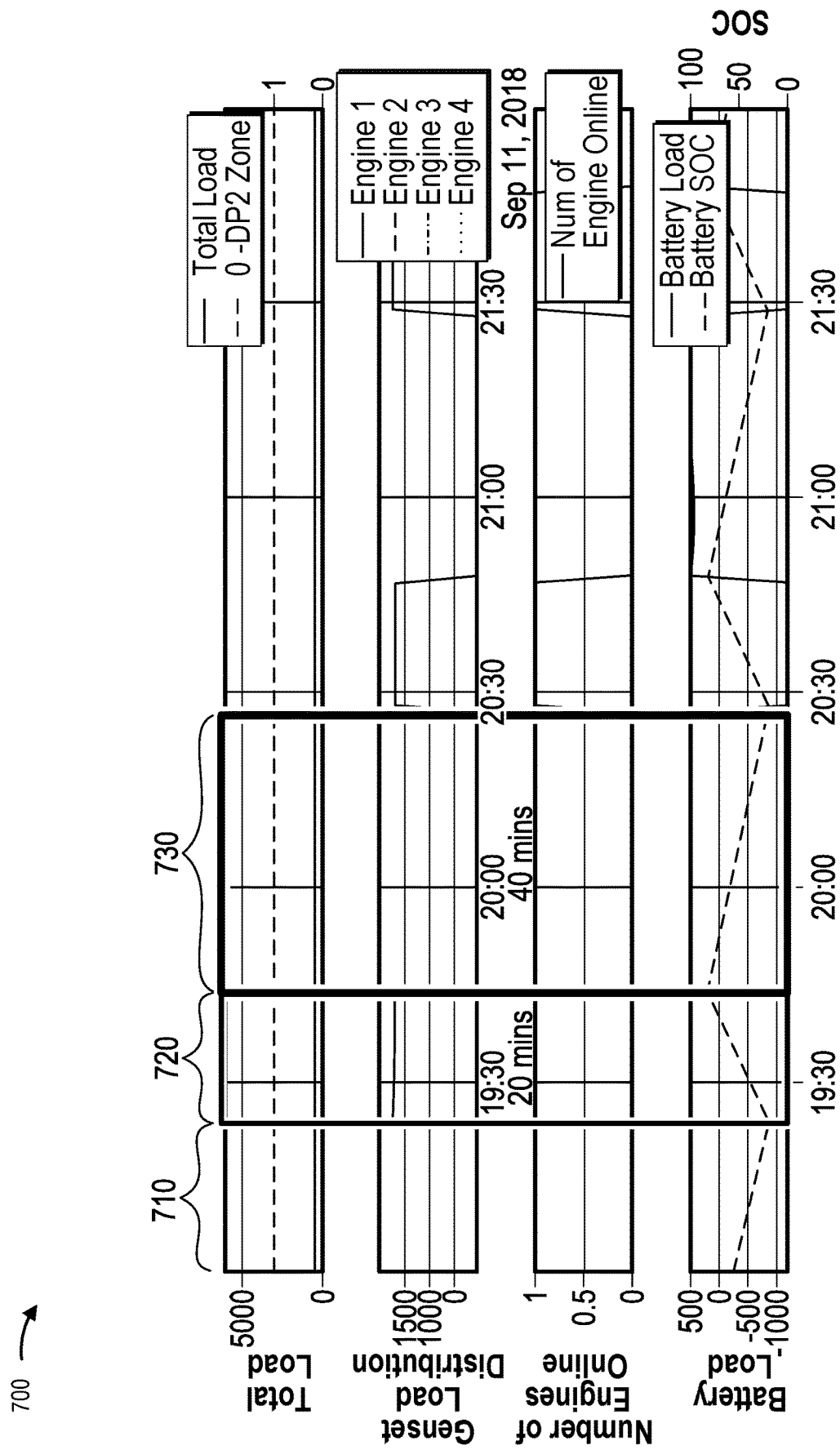
FIG. 7 is a plot of one or more example implementations of a hybrid ESS optimization strategy with intelligent adaptive control described herein.

FIG. 7 is a plot 700 of one or more example implementations of a hybrid ESS optimization strategy with intelligent adaptive control described herein. In some implementations, plot 700 illustrates a technique whereby amounts of time during which a power system is driven by a battery and/or an engine may be controlled to provide improved performance, extend the useful life of the battery and/or engine, and/or the like. For example, repeatedly turning an engine on and off at short intervals may reduce performance of the engine, may cause components of the engine to prematurely degrade, and/or the like. Similarly, charging and discharging the battery for short periods may reduce capacity of the battery due to component degradation or cause other performance problems. In FIG. 7, the x-axis for all four graphs represents time, the y-axis for the first graph represents a total load in a power system (e.g., in kilowatts), the y-axis for the second graph represents a portion of the total load (e.g., in kilowatts) supported by multiple engines in a genset, the y-axis for the third graph represents a number of the engines in the genset that are online at a particular time, and the y-axis for the fourth graph represents a portion of the total load (e.g., in kilowatts) supported by one or more batteries.

Accordingly, as shown by reference number 710, a battery having a high charge level may initially be discharged to handle a total load associated with a power system. As shown by reference number 720, an engine may be turned on to handle at least a portion of the load (e.g., based on the battery charge level satisfying a threshold), and the engine may remain on for at least a minimum duration (e.g., 20 minutes, in plot 700) to ensure that the engine operates at a high efficiency and/or performance level. As shown by reference number 730, the engine may be turned off after the minimum duration has elapsed and/or the battery has been charged to a level sufficient to handle a larger load, and the engine may remain off for a duration (e.g., forty minutes, in plot 700) to avoid repeatedly turning the engine on and off. In some cases, maintaining the engine in the on state and/or the off state for at least minimum durations may not necessarily provide the optimal fuel efficiency, but may improve performance of the engines, extend the useful life of the engines, and/or the like.

As indicated above, FIG. 7 is provided as one or more examples. Other examples may differ from what is described in connection with FIG. 7.

Figure 8:
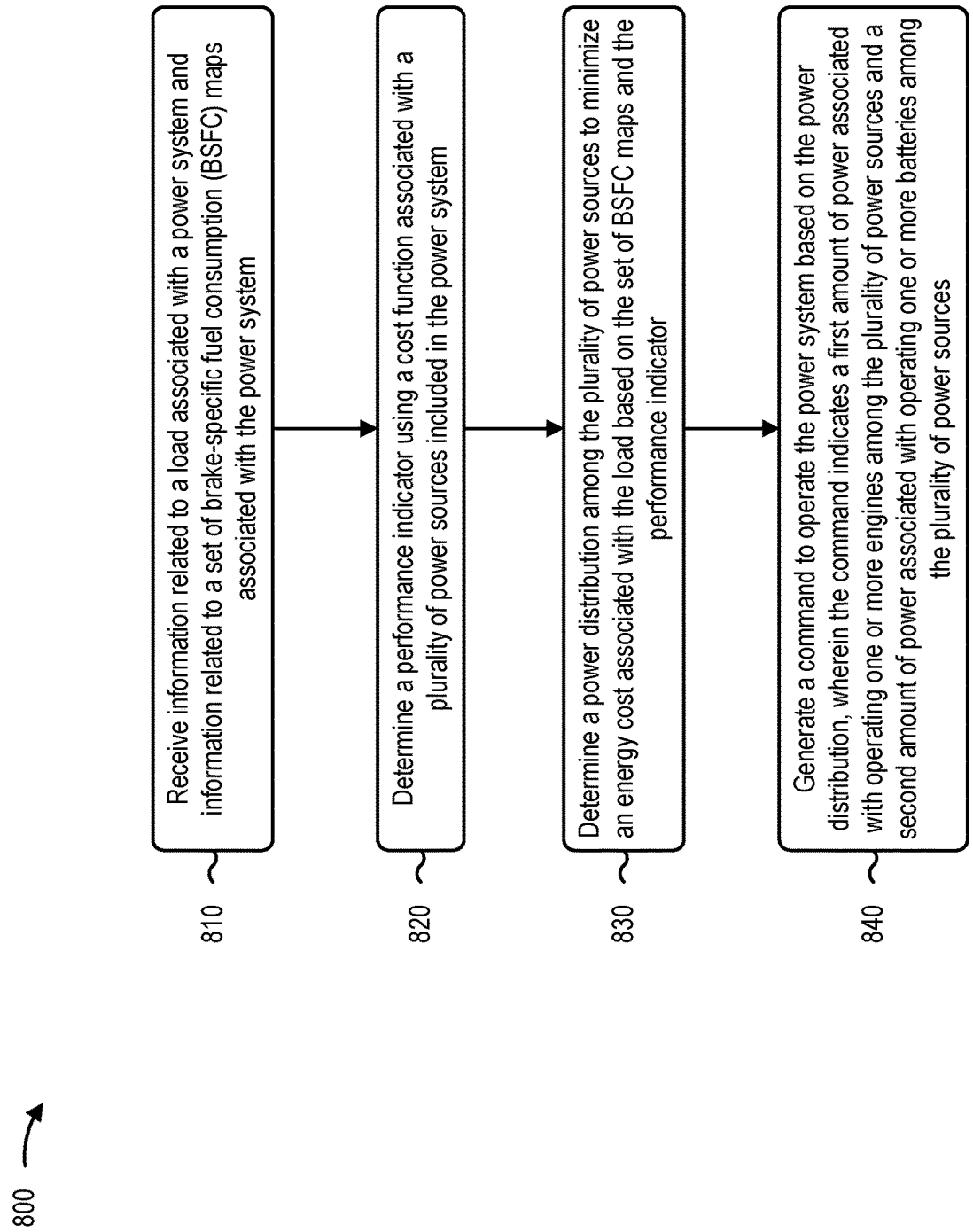
FIG. 8 is a flowchart of an example process for implementing a hybrid ESS optimization strategy with intelligent adaptive control.

FIG. 8 is a flowchart of an example process 800 for implementing a hybrid ESS optimization strategy with intelligent adaptive control. One or more process blocks of FIG. 8 may be performed by a device, such as a power controller (e.g., power controller 110), and/or another device or a group of devices separate from or including the power controller (e.g., an ECM associated with engine(s) 122, a BDP inverter or controller associated with ESS 130, and/or another device associated with implementation(s) 100, implementation(s) 200, and/or the like).

As shown in FIG. 8, process 800 may start by receiving information related to a load associated with a power system and information related to a set of BSFC maps associated with the power system (block 810). For example, the set of BSFC maps may include one or more BSFC maps that measure fuel efficiency for one or more engines, one or more battery-equivalent BSFC maps that are based on an accumulated energy cost associated with charging and discharging the one or more batteries, an estimated life associated with the one or more batteries, a replacement cost for the one or more batteries, and/or the like.

Next, the process 800 may include determining a performance indicator using a cost function associated with a plurality of power sources included in the power system (block 820). For example, the power controller may determine a performance indicator using a cost function associated with a plurality of power sources included in the power system, as described above.

The process 800 may include determining a power distribution among the plurality of power sources to minimize an energy cost associated with the load based on the set of BSFC maps and the performance indicator (block 830). For example, the power controller may generate, based on the set of BSFC maps and the performance indicator, a dynamic optimization map that indicates a fuel savings based on different load conditions and charge levels associated with the one or more batteries, and the power controller may determine the power distribution among the plurality of power sources based on the dynamic optimization map. In another example, the power controller may apply one or more machine learning techniques to determine the power distribution proportion that minimizes the energy cost.

As further shown in FIG. 8, process 800 may include generating a command to operate the power system based on the power distribution, wherein the command indicates a first amount of power associated with operating one or more engines among the plurality of power sources and a second amount of power associated with operating one or more batteries among the plurality of power sources (block 840). For example, the power controller may determine that a machine associated with the power system is in a dynamic positioning zone that requires a backup power source, in which case the command may cause at least two of the plurality power sources to be operational while the machine is in the dynamic positioning zone. In another example, the command causes the one or more engines to generate the first amount of power to charge the one or more batteries based on the load failing to satisfy a first threshold and/or a charge level associated with the one or more batteries failing to satisfy a second threshold. Additionally, or alternatively, the command causes the one or more batteries to generate the second amount of power to delay or avoid starting the one or more engines based on the load satisfying a first threshold and/or a charge level associated with the one or more batteries satisfying a second threshold, to perform peak shaving that prevents the first amount of power from exceeding a threshold, to provide instantaneous support to the one or more engines based on a response time associated with the load, and/or the like. In some implementations, the first amount of power may be equally or unevenly distributed among the one or more engines based on health information associated with the plurality of power sources, and the second amount of power may have a positive value to indicate that the one or more batteries are to be discharged or a negative value to indicate that the one or more batteries are to be charged.

Process 800 may include variations and/or additional implementations to those described in connection with FIG. 8, such as any single implementation or any combination of implementations described elsewhere herein. Although FIG. 8 shows example blocks of process 800, in some examples, process 800 may include additional blocks, fewer blocks, different blocks, or differently arranged blocks than those depicted in FIG. 8. Additionally, or alternatively, two or more of the blocks of process 800 may be performed in parallel.

INDUSTRIAL APPLICABILITY

The control system disclosed herein may implement a hybrid ESS optimization strategy applicable to any mobile machine having a power system in which multiple power sources cooperate to drive the mobile machine and to power a primary load and/or one or more auxiliary loads under varying conditions. The control system may reduce overall fuel consumption, improve performance, and extend the useful life of the multiple power sources while also complying with restrictions and/or regulatory requirements through optimization of load sharing under various operating constraints. Thus, the hybrid ESS optimization strategy implemented by the control system can be used to control a power system with a combination of highly diverse power sources.

For example, in cases where the power system includes multiple engines, a load may be evenly or unevenly distributed among the multiple engines to ensure that each engine operates at a maximum fuel efficiency, to reduce a total amount of fuel consumed by each engine, to balance or level an instantaneous and/or cumulative load supported by each engine, to preserve and/or extend the useful life of each engine, and/or the like. Furthermore, in cases where the power system includes one or more batteries, the batteries may provide a spinning reserve and blackout prevention by acting as a backup for electrical generators that are driven by the engines. The batteries may further be used to implement peak shaving to act as a buffer and level the load supported by the engines (individually and/or collectively), to optimize an operating point of the engines and/or batteries to reduce maintenance and/or replacement costs, to provide instantaneous power to support the electrical generators driven by the engines, and/or the like. Accordingly, as described herein, the control system may dynamically adapt to different operating conditions and input parameters related to the overall state of a power system to improve performance (e.g., increased acceleration or additional power on-demand), to reduce emissions (e.g., locally and/or in cycles), to optimize fuel consumption, to reduce total cost of ownership by reducing maintenance and operation costs, to improve user comfort (e.g., by enabling silent operation and/or reducing odors and/or safety risks caused by fuel combustion), and/or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, by a device:
      information related to a load associated with a power system, and
      information related to a set of brake-specific fuel consumption (BSFC) maps associated with the power system;
   determining, by the device, a performance indicator using a cost function associated with a plurality of power sources included in the power system;
   determining, by the device and based on the set of BSFC maps and the performance indicator, a power distribution among the plurality of power sources to minimize an energy cost associated with the load; and
   generating, by the device, a command to operate the power system based on the power distribution,
      wherein the command indicates a first amount of power associated with operating one or more engines among the plurality of power sources and a second amount of power associated with operating one or more batteries among the plurality of power sources.

2. The method of claim 1, further comprising:
   generating a dynamic optimization map based on the load associated with the power system, the set of BSFC maps, and the performance indicator,
      wherein the dynamic optimization map indicates a fuel savings based on different load conditions and charge levels associated with the one or more batteries, and
   determining, based on the dynamic optimization map, the power distribution among the plurality of power sources.

3. The method of claim 1, further comprising:
   determining that a machine associated with the power system is in a dynamic positioning zone that requires a backup power source,
      wherein the command causes at least two of the plurality of power sources to be operational while the machine is in the dynamic positioning zone.

4. The method of claim 1, wherein the command causes the one or more engines to generate the first amount of power to charge the one or more batteries based on one or more of the load failing to satisfy a first threshold or a charge level associated with the one or more batteries failing to satisfy a second threshold.

5. The method of claim 1, wherein the command causes the one or more batteries to generate the second amount of power to delay or avoid starting the one or more engines based on one or more of the load satisfying a first threshold or a charge level associated with the one or more batteries satisfying a second threshold.

6. The method of claim 1, wherein the command causes the one or more batteries to generate the second amount of power to perform peak shaving that prevents the first amount of power from exceeding a threshold.

7. The method of claim 1, wherein the first amount of power is equally or unevenly distributed among the one or more engines based on health information associated with the plurality of power sources.

8. The method of claim 1, wherein the command causes the one or more batteries to generate the second amount of power to provide instantaneous support to the one or more engines based on a response time associated with the load.

9. The method of claim 1, wherein the second amount of power has a positive value to indicate that the one or more batteries are to be discharged or a negative value to indicate that the one or more batteries are to be charged.

10. The method of claim 1, wherein the set of BSFC maps include:
   one or more BSFC maps that measure fuel efficiency for the one or more engines, and
   one or more battery-equivalent BSFC maps that are based on an accumulated energy cost associated with charging and discharging the one or more batteries, an estimated life associated with the one or more batteries, and a replacement cost for the one or more batteries.

11. A device, comprising:
   one or more memories; and
   one or more processors, communicatively coupled to the one or more memories, configured to:
      receive a set of input parameters comprising a load associated with a power system, a plurality of brake-specific fuel consumption (BSFC) maps respectively associated with a plurality of engines, and a battery-equivalent BSFC map associated with one or more batteries;
      determine one or more performance indicators using a cost function based on health information associated with the plurality of engines and health information associated with the one or more batteries;
      generate a dynamic optimization map based on the set of input parameters and the one or more performance indicators; and
      generate, based on the dynamic optimization map, a command to operate the power system according to a power distribution that minimizes an energy cost associated with the load.

12. The device of claim 11, wherein the dynamic optimization map indicates a fuel savings based on different load conditions and charge levels associated with the one or more batteries.

13. The device of claim 11, wherein the command causes one or more of the plurality of engines to generate an amount of power to charge the one or more batteries based on one or more of the load failing to satisfy a first threshold or a charge level associated with the one or more batteries failing to satisfy a second threshold.

14. The device of claim 11, wherein the command causes the one or more batteries to generate an amount of power to delay or avoid starting one or more of the plurality of engines based on one or more of the load satisfying a first threshold or a charge level associated with the one or more batteries satisfying a second threshold.

15. The device of claim 11, wherein the command causes the one or more batteries to generate a first amount of power to perform peak shaving that prevents the plurality of engines from generating a second amount of power that exceeds a threshold.

16. A machine, comprising:
   a power system including a plurality of power sources; and
   a power controller including one or more processors configured to:
     receive information related to a set of brake-specific fuel consumption (BSFC) maps associated with the plurality of power sources;
     determine a performance indicator using a cost function based on health information associated with the plurality of power sources; and
     generate, based on the information related to the set of BSFC maps, the performance indicator, and a load associated with the power system, a command to operate the power system based on a power distribution that minimizes an energy cost to operate the power system.

17. The machine of claim 16, wherein the one or more processors are further configured to:
   receive information indicating whether the machine is in a dynamic positioning zone that requires a backup power source,
     wherein the command to operate the power system causes at least two power sources, among the plurality of power sources, to be operational based on determining that the machine is in the dynamic positioning zone that requires the backup power source.

18. The machine of claim 16, wherein the command causes the plurality of power sources to generate an amount of power that is equally distributed or unevenly distributed among the plurality of power sources based on one or more of the health information associated with the plurality of power sources or respective priorities associated with the plurality of power sources.

19. The machine of claim 16, wherein the command causes one or more batteries to generate an amount of power to provide instantaneous support to one or more engines based on a response time associated with the load.

20. The machine of claim 16, wherein the one or more processors are further configured to:
   apply one or more machine learning techniques to determine the power distribution that minimizes the energy cost to operate the power system.

* * * * *